UNITED STATES PATENT OFFICE.

JÜRGEN CALLSEN, OF ELBERFELD, GERMANY, ASSIGNOR TO FARBENFABRIKEN VORM. FRIEDR. BAYER AND CO., OF LEVERKUSEN, NEAR COLOGNE ON THE RHINE, GERMANY.

MANUFACTURE AND PRODUCTION OF BROMODIETHYLACETYLCARBOXYALKYL-UREA COMPOUNDS.

1,424,236.      Specification of Letters Patent.      Patented Aug. 1, 1922.

No Drawing.      Application filed August 8, 1921. Serial No. 490,738.

*To all whom it may concern:*

Be it known that I, JÜRGEN CALLSEN, a citizen of Germany, residing at Elberfeld, Germany, have invented new and useful Improvements in the Manufacture and Production of Bromodiethylacetylcarboxyalkyl-Urea Compounds (for which I have made applications in Germany, Aug. 9, 1917; in Austria, July 10, 1918; in Switzerland, July 18, 1918; and in England, Sept. 16, 1919), of which the following is a specification.

My invention concerns the manufacture and production of bromodiethylacetylcarboxyalkyl urea compounds which have proved to be valuable sedatives and soporifics, an average dose being from ¼ to ½ gram.

The process for producing my new products consists in treating bromodiethylacetylisocyanate with alkyl urethanes.

My new products thus obtained are after being dried generally whitish crystalline products soluble in the usual organic solvents and being soluble with difficulty in water. They are split up by treatment with hot caustic soda lye, hydrobromic acid being split off.

In order to illustrate the new process more fully the following example is given, the parts being by weight: 110 parts of bromodiethylacetylisocyanate are heated on the water bath together with 45 parts of ethyl urethane. A thick oil results which is crystallized from petroleum ether.

The acetyl bromodiethylacetyl carboxyethyl urea forms colorless crystals of a faintly bitter taste melting at from 62–63° C.

It is easily soluble in alcohol and ether, soluble with difficulty in petroleum ether and water. It has most probably the following formula:

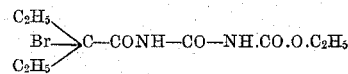

I claim:—

1. The herein described bromodiethylacetyl carboxyalkyl urea compounds being generally crystalline products soluble in the usual organic solvents, soluble with difficulty in water, being split up by treatment with hot caustic soda lye; and being valuable soporifics and sedatives, substantially as described.

2. The herein described bromodiethylacetyl carboxyethyl urea having most probably formula:

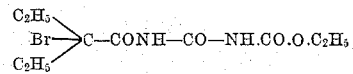

easily soluble in alcohol and ether soluble with difficulty in petrol ether and water melting at 62–63° C. and being a valuable soporific and sedative, substantially as described.

In testimony whereof I have hereunto set my hand in the presence of two subscribing witnesses.

JÜRGEN CALLSEN. [L. S.]

Witnesses:
HANS BRÜCKNER,
EDUARD RAUMSBERG.